(12) United States Patent
Marchetti

(10) Patent No.: US 7,329,961 B2
(45) Date of Patent: Feb. 12, 2008

(54) DEVICE FOR DERIVING ENERGY FROM MOVING FLUIDS

(76) Inventor: Antonio Marchetti, via Seismit-Doda, 43 - 00143 Rome (IT)

( * ) Notice: Subject to any disclaimer, the term of this patent is extended or adjusted under 35 U.S.C. 154(b) by 91 days.

(21) Appl. No.: 10/576,603

(22) PCT Filed: Feb. 6, 2004

(86) PCT No.: PCT/IT2004/000044

§ 371 (c)(1),
(2), (4) Date: Apr. 21, 2006

(87) PCT Pub. No.: WO2005/038250

PCT Pub. Date: Apr. 28, 2005

(65) Prior Publication Data

US 2007/0029805 A1    Feb. 8, 2007

(30) Foreign Application Priority Data

Oct. 22, 2003   (IT) ................. RM2003A0489

(51) Int. Cl.
*F03B 13/08* (2006.01)
(52) U.S. Cl. ............... 290/54; 290/43; 415/3.1
(58) Field of Classification Search .......... 290/42, 290/43, 44, 53, 54, 55; 415/3.1, 4.3
See application file for complete search history.

(56) References Cited

U.S. PATENT DOCUMENTS

| | | | | |
|---|---|---|---|---|
| 4,755,690 A | * | 7/1988 | Obermeyer | 290/52 |
| 4,804,855 A | * | 2/1989 | Obermeyer | 290/54 |
| 5,440,175 A | * | 8/1995 | Mayo et al. | 290/54 |
| 5,512,787 A | * | 4/1996 | Dederick | 290/4 R |
| 5,825,094 A | * | 10/1998 | Hess | 290/54 |
| 6,320,271 B1 | * | 11/2001 | Hill et al. | 290/2 |
| 6,930,407 B2 | * | 8/2005 | Panholzer | 290/53 |
| 7,061,135 B2 | * | 6/2006 | Rammler et al. | 290/54 |
| 7,262,517 B1 | * | 8/2007 | Srybnik et al. | 290/54 |

FOREIGN PATENT DOCUMENTS

| | | |
|---|---|---|
| DE | 25 55 663 | 6/1977 |
| GB | 165 339 | 6/1921 |
| GB | 701 716 | 12/1953 |
| GB | 2 223 063 | 3/1990 |

* cited by examiner

*Primary Examiner*—Nicholas Ponomarenko
(74) *Attorney, Agent, or Firm*—Young & Thompson

(57) ABSTRACT

A system for energy exploitation of fluvial currents, onto bridges (P) or onto special structures, and for the collection of altitude water to be used as potential energy, and for the application to bi-directional or multi-directional marine and wind currents comprising:—a plurality of floats (1) for the controlled immersion of turbines (4);—a plurality of hooking rods (2) for installation; —a plurality of electric turbines (4) with protection grates (5) and baffles (6);—a plurality of underground downflow channels (7) for the elimination of flood;—a plurality of devices for pumping the water into basins or storage reservoirs;—a plurality of structures (14, 15) shaped for the exploitation of bidirectional wind or submarine currents;—a plurality of structures (18) shaped for the energy exploitation of multi-directional wind or submarine currents.

10 Claims, 5 Drawing Sheets

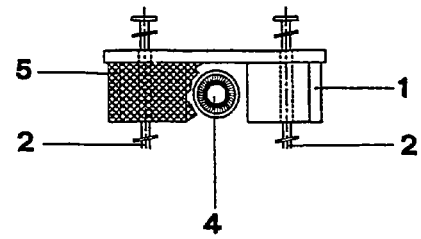
FIG. 3
FIG. 4
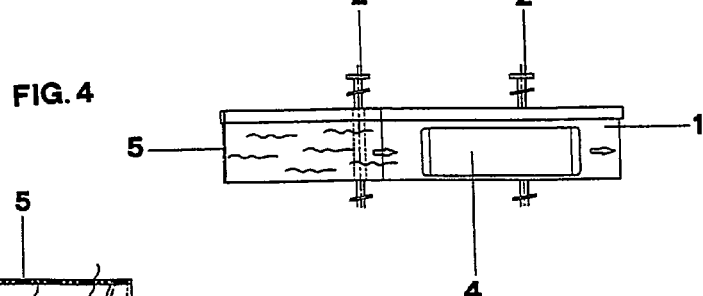
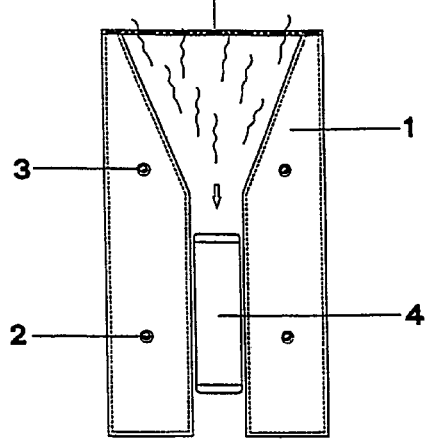
FIG. 5
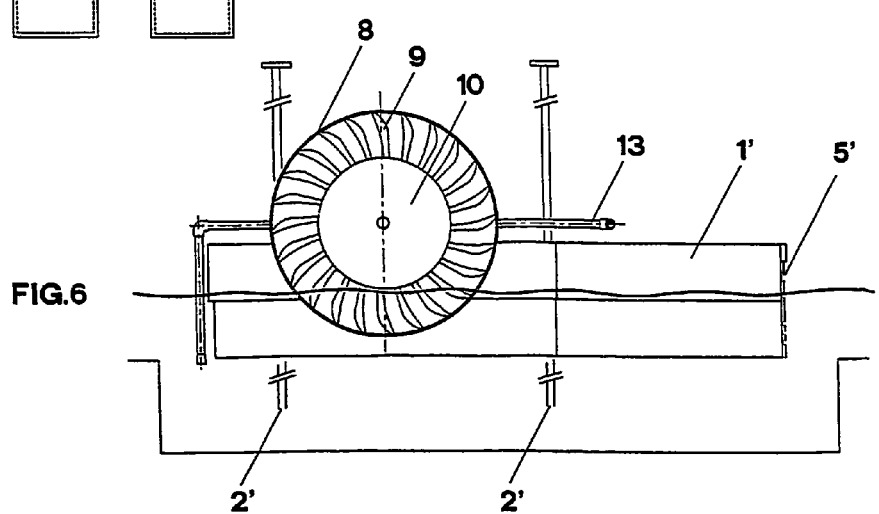
FIG. 6

DEVICE FOR DERIVING ENERGY FROM MOVING FLUIDS

The present invention concerns a system and all the variants thereof for the exploitation of fluvial, marine and wind currents with the purpose of producing renewable and ecologic energy.

It is well known that at present, even if there is a great need of finding new ecologic and renewable energy sources, the important sector of the natural currents of the fluids, like the surface and depth marine currents, the fluvial and the wind currents, is neglected and even ignored.

And the more, such energy sources appear to be fit to supply an important component of the energy consumption.

It is the aim of the present invention to allow an easy, economic and high efficiency exploitation of the natural currents of the fluids, for transforming the same into an energy to be immediately exploited or stored up.

The aim set forth is reached by means of the system according to the present invention, for the energy exploitation of fluvial currents, placed on bridges P or onto special structures, and for altitude water to be used as potential energy, and for the application to bi-directional or multi-directional marine and wind currents.

The present invention will be described more in detail hereinbelow, relating to the enclosed drawings in which some embodiments are shown.

FIGS. 3, 4 and 5 show a front, lateral and planimetric view.

FIGS. 6, 7 and 8 show a lateral, planimetric and front view of a float system for pumping the water into basins or into collection reservoirs.

Figure 1:
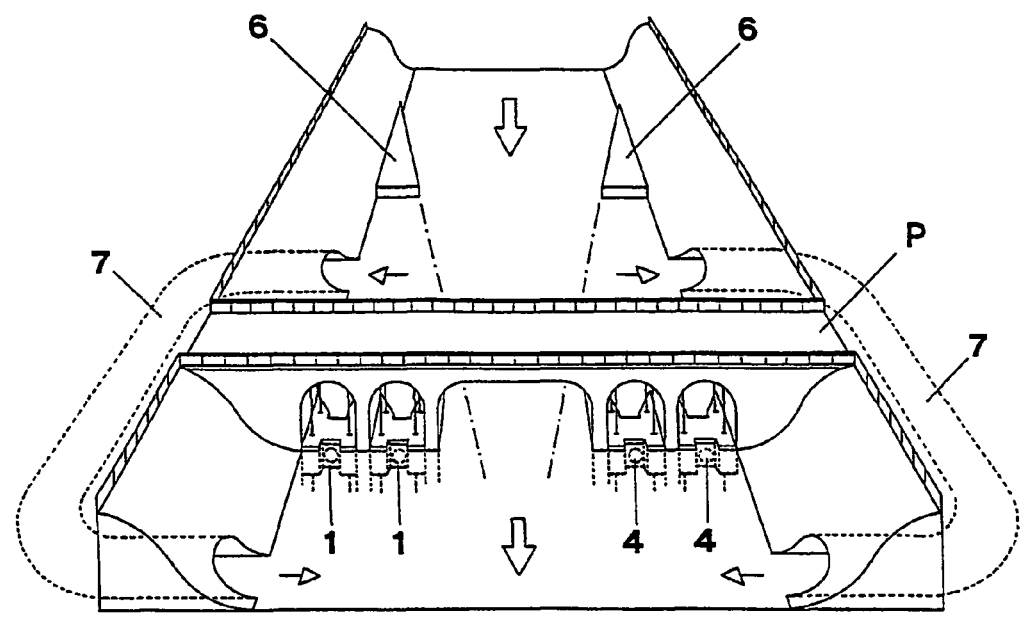
FIGS. 1 and 2 show a perspective view and a front scheme of a system for energy exploitation of fluvial currents, according to the present invention.
Figure 2:
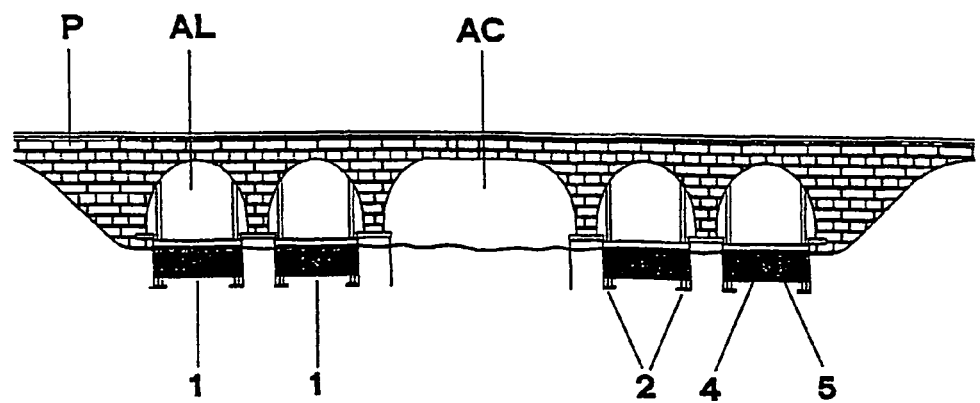
Figure 7:
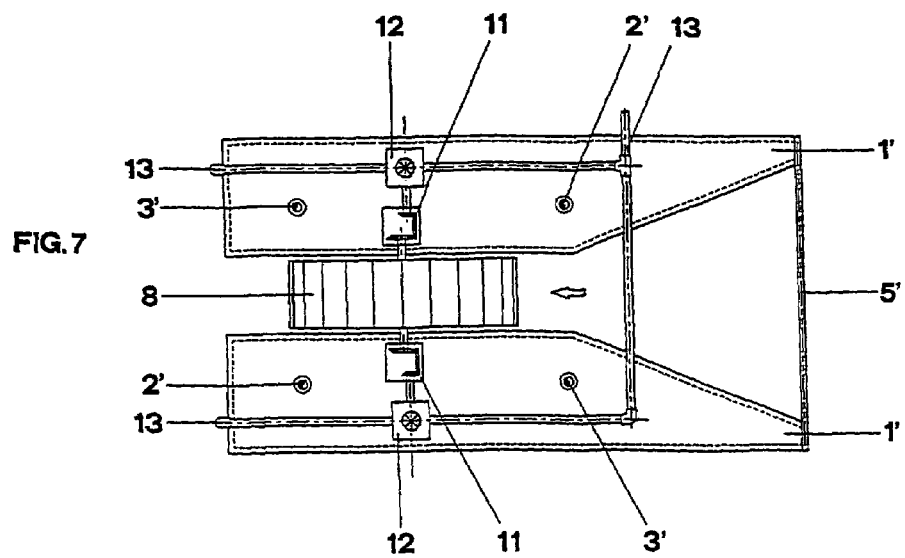
Figure 8:
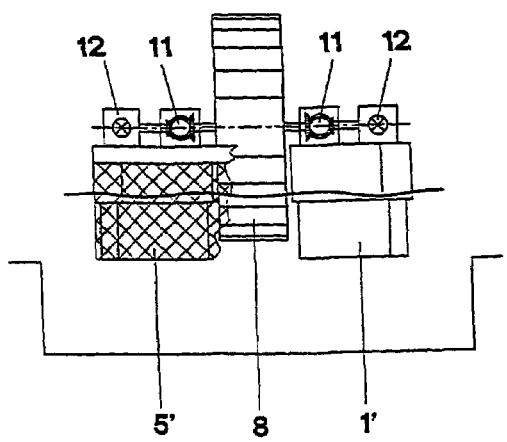
Figure 9:
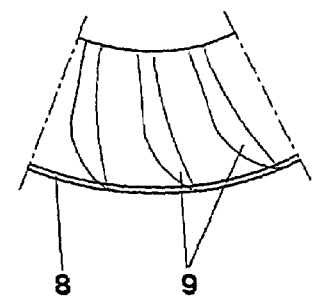
FIGS. 9 and 10 show a lateral and axonometric view of the working of the blades of a turbine for the exploitation of the liquid currents.
Figure 10:
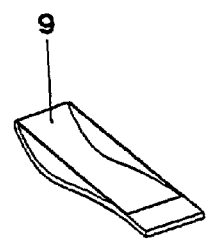

The enclosed figures show a system for energy production from natural currents of the fluids, comprising:
- a plurality of floats 1 which allow a controlled immersion of special turbines 4 in the waterway below a bridge P;
- a plurality of hooking rods 2, passing through a plurality of openings 3 on said floats 1, so as to allow their installation between the lateral arches AL of said bridge P;
- a plurality of electric turbines 4, housed inside said floats 1, operated by the currents of the waterway in which they are immersed;
- a plurality of grates 5 for the protection of said turbines 4, placed onto said floats 1 by means of guide systems which allow an easy removal for maintenance or complete replacing.

As far as the working of the system according to the present invention is concerned, the funnel-shape of the floats 1, as shown in FIGS. 3, 4 and 5 determine an increase of the power of the waterway current flowing through turbines 4—proportional to the width and to the length of the storage—thus determining a consequent increase of the total efficiency.

With the purpose of preventing collisions with silt which, transported by the current, might cause damage, the present invention provides the presence of special floating baffles 6, placed upstream of said bridge P and appropriately oriented so as to lead the floating silt towards the centre of the waterway, forcing its passage through the central arch AC of said bridge P,.being of such dimension that it is impossible to obstruct it; while said floats 1, placed between the lateral arches AL of said bridge P, are provided with special grates 5 for the protection of turbines 4, so as to avoid bumps with silt escaped from the action of said baffles 6.

For the same purpose, known means are used for the temporary raising or the temporary immersion of above mentioned devices by means of electronic controls controlled by level meters, able to determine the increase of weight introducing water inside said floats 1 through special valves, with the intention of determining the movement of the same onto said hooking rods 2 present between the lateral arches AL of said bridge P.

On the other hand, the realization of special underground downflow channels 7 is provided for standing floods, and said channels are realized in correspondence of the waterway level in its normal condition, so as to favour the elimination of exceeding water and maintain the level at such a height as not to compromise the functionality of the device and prevent possible structural damages to the bridge P, from which said devices are released.

For what concerns the variant shown in FIGS. 6, 7, 8, 9 and 10 for pumping the water into storage basins or reservoirs, the following elements are shown:
- a plurality of floats 1', for supporting a turbine 8;
- eventual hooking rods 2', passing through a plurality of openings 3' on said floats 1', so as to assure the system to the ground of the river or onto special structures;
- a turbine 8 provided with shaped blades 9, operated by the current of the waterway, and its movement is stored and made uniform by a fly-wheel 10 connected thereto;
- a plurality of grates 5' for the protection of said turbines 8, placed on said floats 1' by means of guide systems allowing an easy removing for maintenance or complete replacing;
- mechanical transmissions 11 with differential gear, for transferring the motion of said turbine 8 towards special compressors 12, thus determining the functioning thereof;
- a plurality of compressors 12 for pumping the water and leading it towards the collection and distribution basins or reservoirs 13.

For what concerns the functioning, the special shape of said floats 1' determines an increase of the power with which the current of the waterway puts into rotation the turbine 8, through the action of the blades 9, thus increasing the total efficiency.

The rotation of said turbine 8, made uniform by the action of the fly-wheel 10, is transferred from differential gears 11 to compressors 12 for the pumping of the water, and lead towards collection basins or reservoirs or, in alternative, towards the users through storage and distribution pipings 13.

In a variant, said compressors 12 may be replaced by generators or magnets for energy production.

Figure 11:
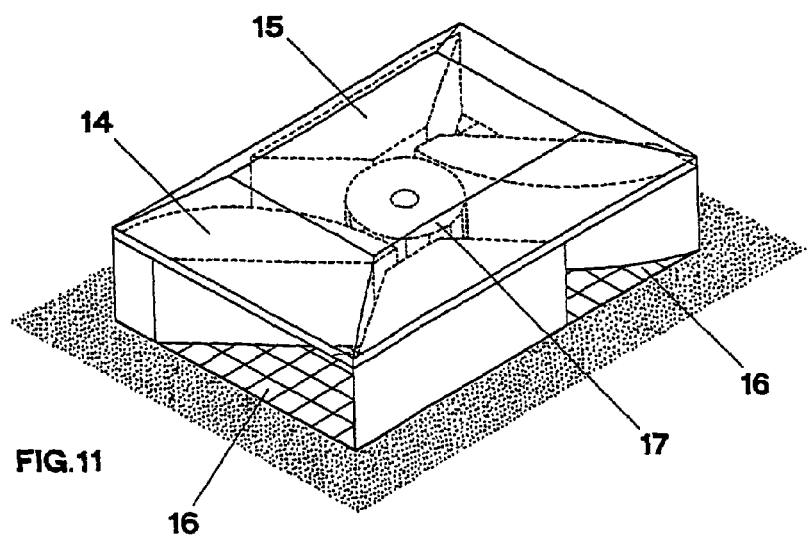
FIGS. 11 and 12 show an axonometric and planimetric view of some variants for energy exploitation of bidirectional wind or submarine currents.
Figure 12:
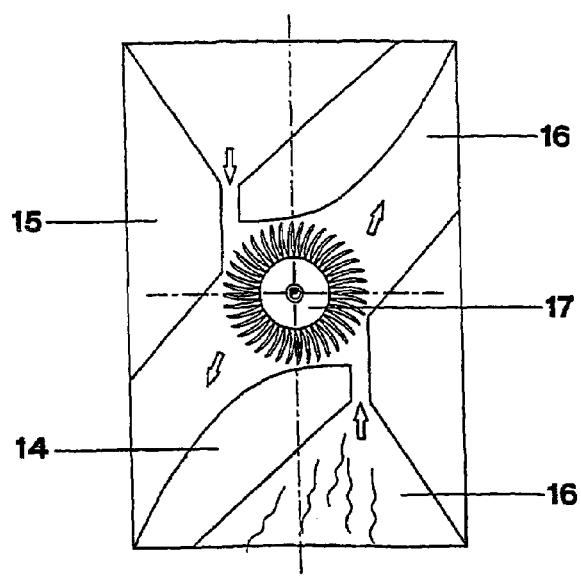

The variant of the system for the exploitation of bi-directional wind or submarine currents, shown in FIGS. 11 and 12, consists of a whole of structures 14, 15 specially shaped for the purpose of giving place to particular forced channels 16 for guiding the currents, in the two directions, to the central turbine 17.

Figure 13:
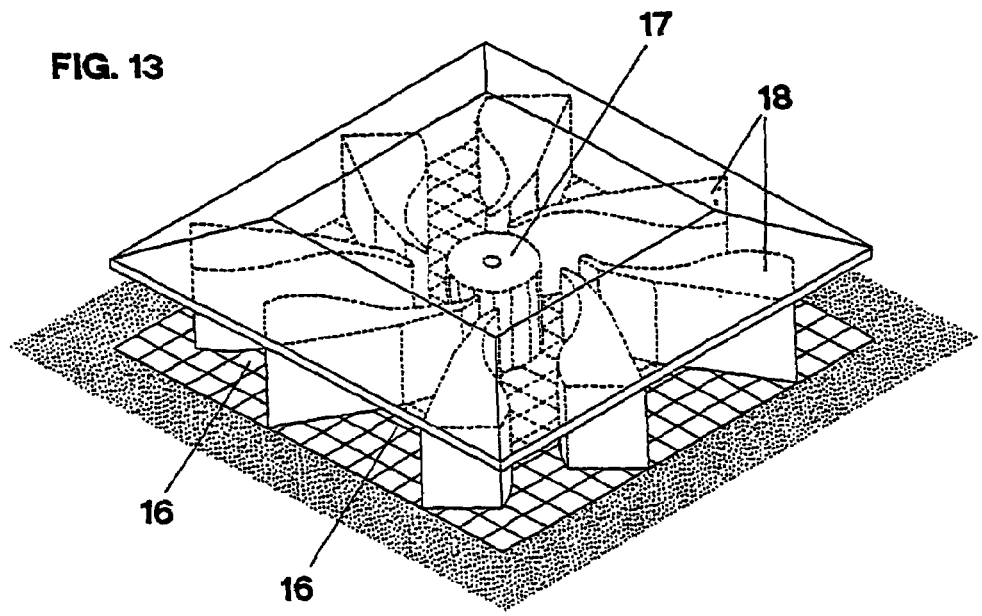
FIGS. 13 and 14 show an axonometric and planimetric view of some variants of the system according to the present invention for the energy exploitation of multi-directional wind or submarine currents.
Figure 14:
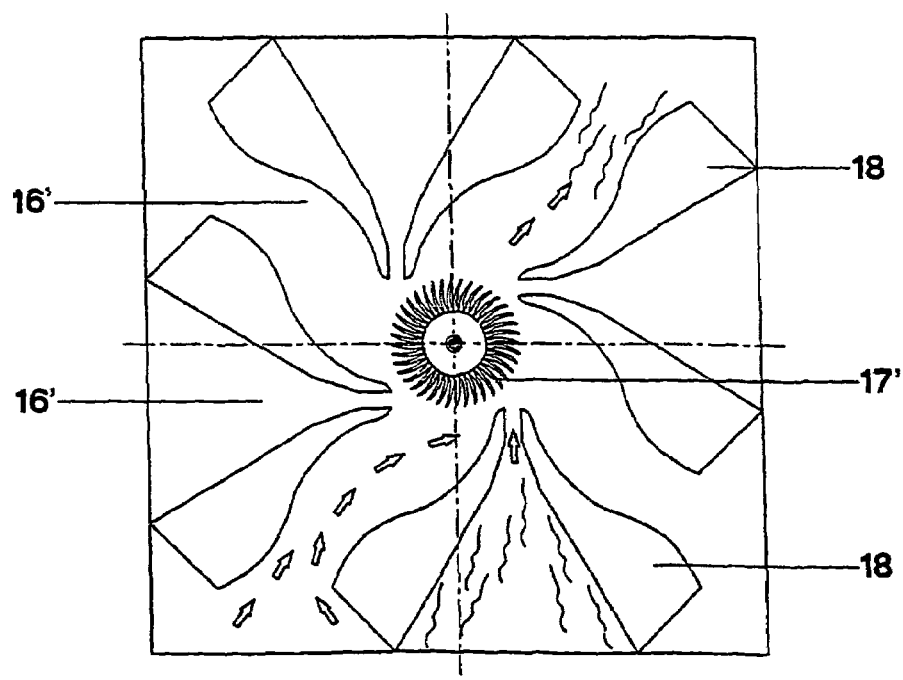

In the variant shown in FIGS. 13 and 14, the energy exploitation of multi-directional wind or submarine currents provides a whole of structures 18 shaped in such a way as to give place to special forced channels 16', for guiding the currents towards the central turbine 17', independently from their direction.

The invention claimed is:

1. A system for energy production from the natural currents of the fluids, concerning fluvial currents, on bridges (P) or onto special structures, with the collection of altitude water to be used as potential energy, and concerning also bi-directional or multi-directional marine and wind currents, characterized in:
   a plurality of floats (1) which allow a controlled immersion of special turbines (4) in the waterway below a bridge (P);
   a plurality of hooking rods (2), passing through a plurality of openings (3) on said floats (1), so as to allow their installation between the lateral arches (AL) of said bridge (P);
   a plurality of electric turbines (4), housed inside said floats (1), operated by the currents of the waterway in which they are immersed;
   a plurality of grates (5) for the protection of said turbines (4), placed onto said floats (1) by means of guide systems which allow an easy removal for maintenance or complete replacing.

2. A system according to claim 1, characterized in the funnel-shape of said floats (1) that determines an increase of the power of the waterway current flowing through turbines (4)—proportional to the width and to the length of the storage—with a consequent increase of the total efficiency.

3. A system according to claim 1, characterized in the presence of baffles (6) placed upstream of said bridge (P), oriented in such a way as to guide the silts transported by the current towards the centre of the waterway, forcing the passage thereof through the central arch (AC) of said bridge (P), and in grates (5) for the protection of said turbines (4).

4. A system according to claim 1, characterized in the presence of underground downflow channels (7) which favour, in case of flood, the elimination of exceeding water and maintain the water level at a height that does not compromise the functionality thereof.

5. A system according to claim 1 for pumping water into collection basins or reservoirs, characterized in:
   a plurality of floats (1'), for supporting a turbine (8);
   eventual hooking rods (2'), passing through a plurality of openings (3') on said floats (1'), so as to assure the system to the ground of the river or onto special structures;
   a turbine (8) provided with shaped blades (9), operated by the current of the waterway, and its movement is stored and made uniform by a fly-wheel (10) connected thereto;
   a plurality of grates (5') for the protection of said turbines (8), placed on said floats (1') by means of guide systems allowing an easy removing for maintenance or complete replacing;
   mechanical transmissions (11) with differential gear, for transferring the motion of said turbine (8) towards special compressors (12), thus determining the functioning thereof;
   a plurality of compressors (12) for pumping the water and leading it towards the collection and distribution basins or reservoirs (13).

6. A system according to claim 1, characterized in the shape of said floats (1') for determining an increase of the power with which the current of the waterway puts into rotation said turbine (8), through the action of said blades (9), thus increasing the total efficiency.

7. A system according to claim 6, characterized in that the rotation of said turbine (8), made uniform by the action of the fly-wheel (10), is transferred by differential gears (11) to compressors (12) for pumping the water, lead towards collection basins or reservoirs, or as an alternative towards the user, through collection and distribution pipings (13).

8. A system according to claim 6, characterized in that said compressors (12) are replaced by generators or magnets for the energy production.

9. A system according to claim 1, for the exploitation of bi-directional wind or submarine currents, characterized in the presence of structures (14,15) shaped for giving place to special forced channels (16) for leading the currents in the two directions towards the central turbine (17).

10. A system according to claim 1, for the energy exploitation of multi-directional wind or submarine currents, characterized in structures (18) shaped for giving place to special forced channels (16') for leading the currents towards the central turbine (17'), independently from their direction.

* * * * *